United States Patent [19]

DeSantis et al.

[11] 4,390,335
[45] Jun. 28, 1983

[54] DIE, PUNCH AND CORE ROD ASSEMBLY FOR COMPACTING POWDER MATERIAL

[75] Inventors: Raymond P. DeSantis, Troy; Herbert J. Puffer, Jr., Garden City, both of Mich.

[73] Assignee: PTX-Pentronix, Inc., Lincoln Park, Mich.

[21] Appl. No.: 351,482

[22] Filed: Feb. 23, 1982

[51] Int. Cl.³ .................... B30B 11/02; B30B 15/02
[52] U.S. Cl. ........................... 425/78; 425/352; 425/406; 249/160; 249/205; 403/262; 403/320; 411/393; 411/292
[58] Field of Search ............... 425/78, 352, 354, 355, 425/192, 77, 451.2, DIG. 223, 590, 406; 249/160, 205, 142, 144, 67, 68, 163; 403/362, 320; 411/393

[56] References Cited

U.S. PATENT DOCUMENTS

| | | | |
|---|---|---|---|
| 1,541,357 | 6/1925 | Johnson | 425/352 X |
| 1,861,506 | 6/1932 | Nelson | 411/393 X |
| 2,338,491 | 1/1944 | Cutler | 425/78 |
| 2,640,325 | 6/1953 | Haller | 425/78 X |
| 3,132,379 | 5/1964 | Crane | 425/78 |
| 3,191,232 | 6/1965 | Haller | 425/78 |
| 3,345,691 | 10/1967 | Aoki | 425/451.2 X |
| 3,414,940 | 12/1968 | Vinson | 425/78 |
| 3,593,366 | 7/1971 | Smith | 425/78 |
| 3,664,784 | 5/1972 | Sibley | 425/78 |
| 3,677,673 | 7/1972 | Shapiro | 425/78 |
| 3,687,588 | 8/1972 | Smith | 425/78 X |
| 4,017,236 | 4/1977 | Penkman et al. | 425/451.2 X |
| 4,153,399 | 5/1979 | De Santis | 425/78 |
| 4,347,091 | 8/1982 | De Santis | 425/78 |

*Primary Examiner*—J. Howard Flint, Jr.
*Attorney, Agent, or Firm*—Hauke & Patalidis

[57] ABSTRACT

A die, punch and core rod assembly for a powder compacting press wherein the core rod or rods remain stationary while the punch or punches are reciprocable relative to the die. The invention provides individual longitudinal position adjustment for the core rods by fitting the end of the core rods in a threaded member such as a set screw threading in a bore in the core rod support plate. Alternatively, the invention provides for position adjustment of the core rod support plate by supporting the support plate below the die plate by spacer sleeves having a threaded peripheral portion threading in a bore in the core rod support plate. By combining an adjustable core rod support plate with individually adjustable core rods, the core rods can be adjusted longitudinally relative to each other, and in unison by way of the position adjustment provided for their support plate.

7 Claims, 11 Drawing Figures

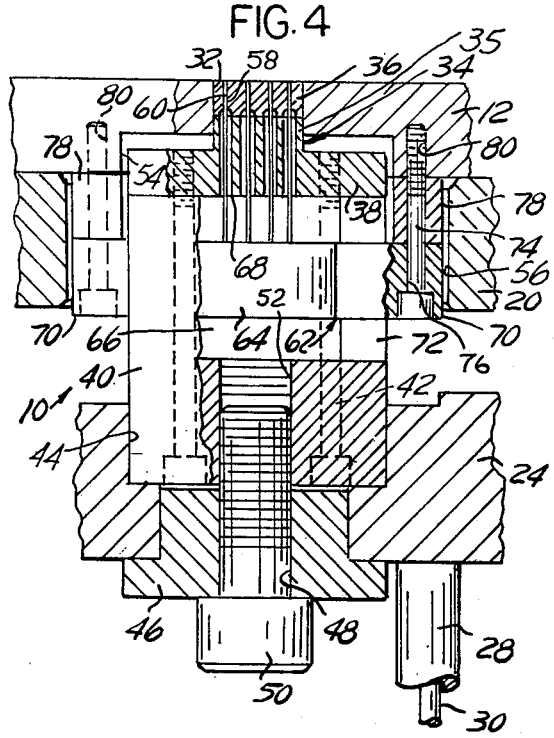
FIG.4
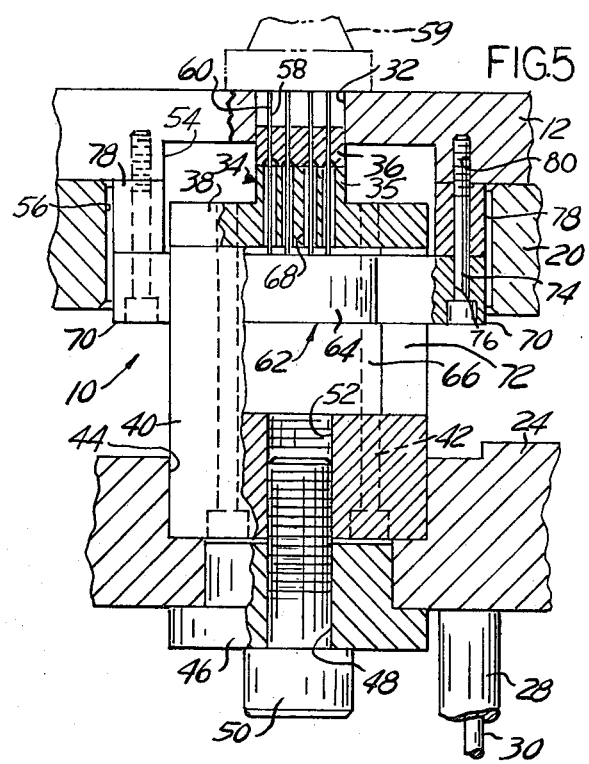
FIG.5
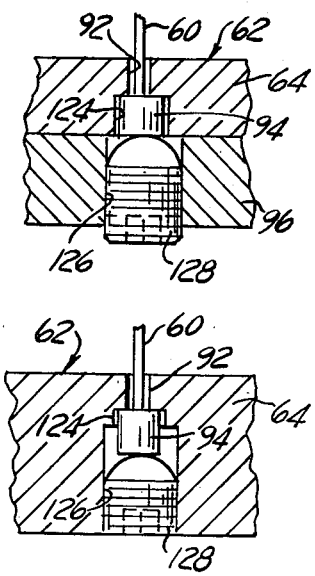
FIG.9
FIG.10
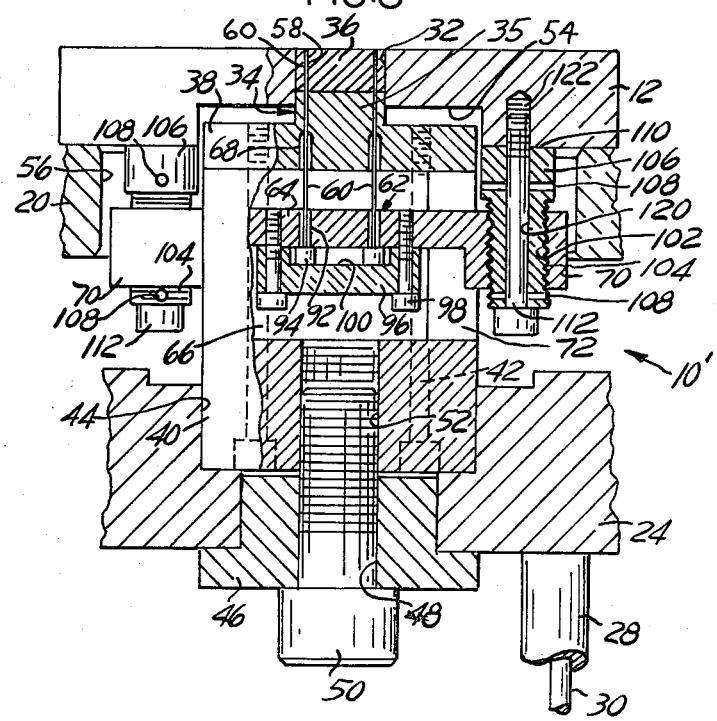
FIG.8

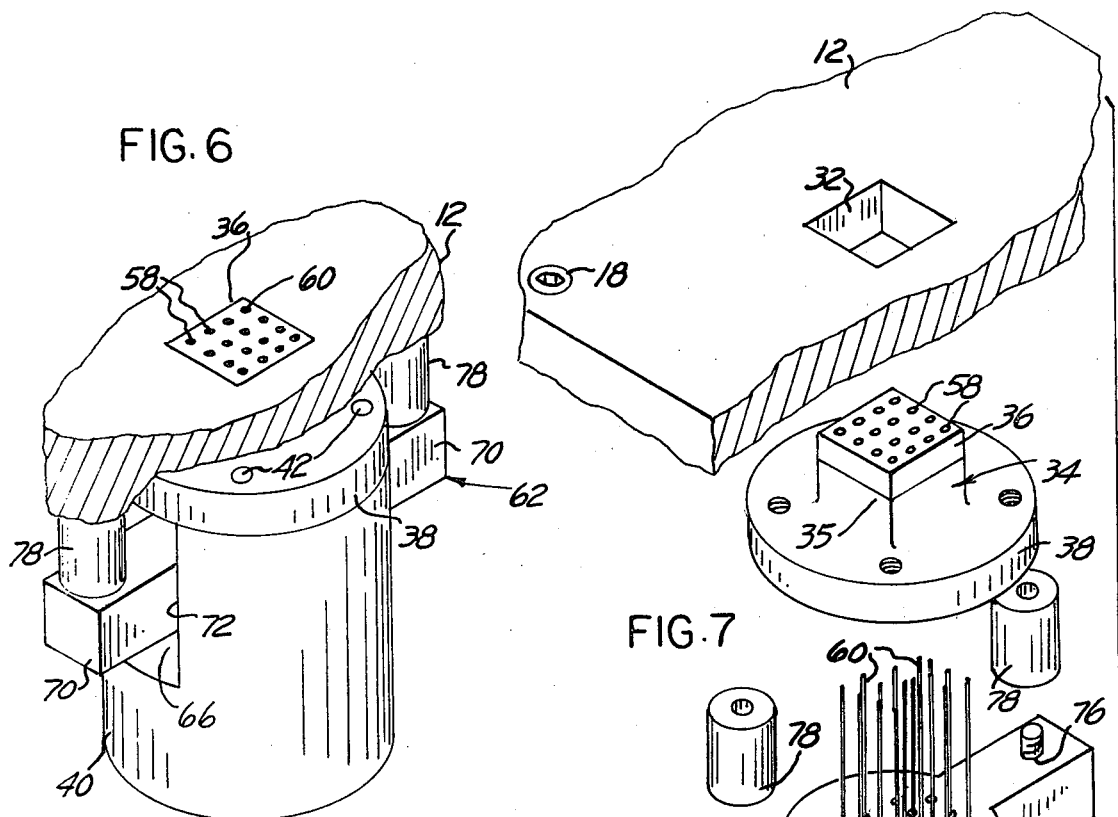
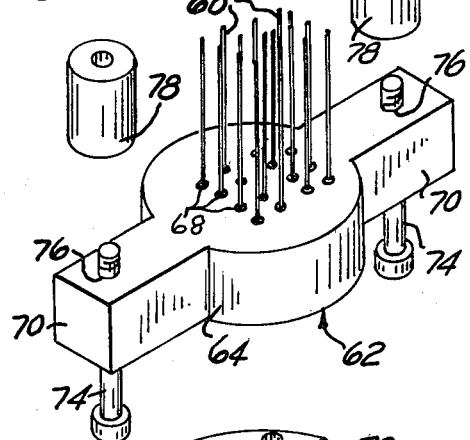
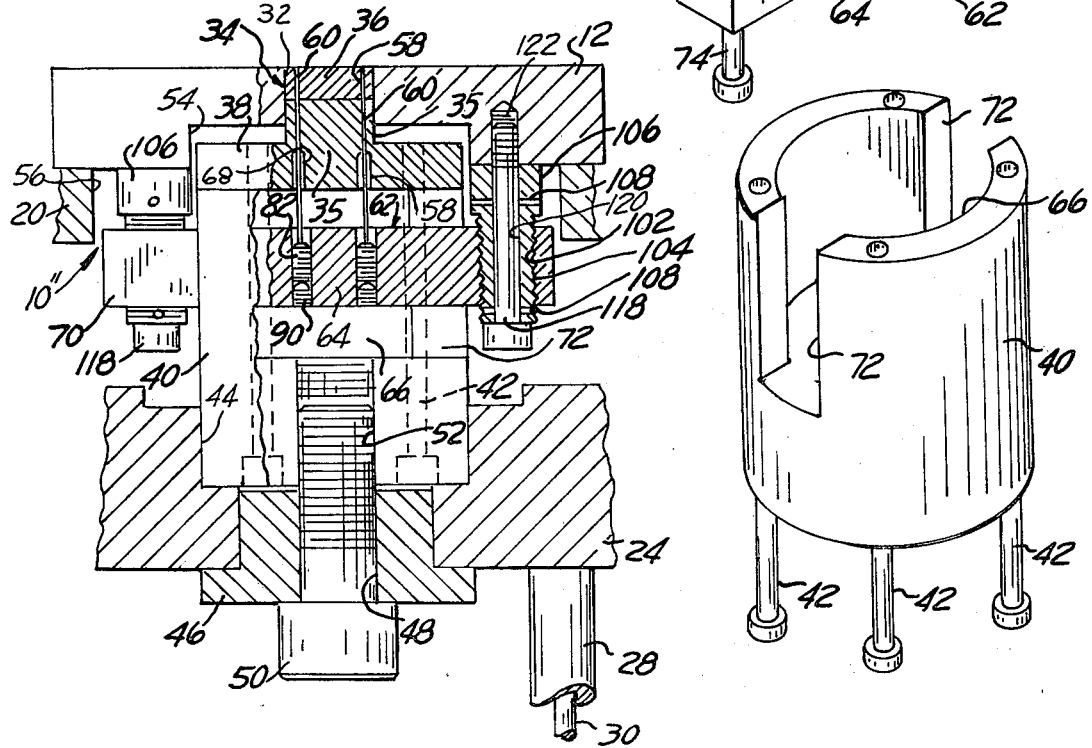

DIE, PUNCH AND CORE ROD ASSEMBLY FOR COMPACTING POWDER MATERIAL

CROSS-REFERENCE TO RELATED PATENTS

The present application is an improvement on the punch and die assemblies for compacting powder material disclosed and claimed in U.S. Pat. Nos. 3,328,840, 3,414,940, 3,561,056, 3,574,892, 3,621,534, 3,640,654, 3,669,582, 3,671,157, 3,775,032, 3,805,370, 3,822,974, 4,053,267 and 4,513,999, all assigned to the same assignee as the present application.

BACKGROUND OF THE INVENTION

The present invention relates to powder material compacting presses, more particularly to an improved die, punch and core rod assembly for powder compacting presses.

In powder compacting presses as disclosed in U.S. Pat. Nos. 3,328,840, 3,344,213, 3,328,842, 3,414,940, 3,561,054, 3,726,622, 3,741,697, 3,775,032, 3,805,370 and 3,822,974, all assigned to the same assignee as the present application, there are disclosed apparatus such as presses and tools for such presses for compacting powder material, such as powdered metal, ferrite, glass and other materials into diverse articles such as toroids, beads, pellets and the like. In the powder compacting apparatus disclosed in the aforementioned patents, the articles are formed in single or multi-cavity dies, in which reciprocable punches are disposed, by compaction of the powder material between the punch end face and an anvil displaceable over the die cavity so as to overlap the die cavity.

A work station positioner assembly, forming part of the press apparatus, is disposed angularly or linearly movable over the die plate and is provided with three separate or integral elements, a powder dispenser unit, an anvil, and a pick-up head. The powder dispenser unit is first positioned over the die cavity to fill the die cavity with a predetermined amount of powder material. The dispenser unit is then removed from above the work station positioner assembly, and the anvil unit is in turn positioned over the die cavity and clamped in position. The punch is reciprocated upwardly in the die such as to compact the powder material between the punch end face and the anvil. The anvil is then unclamped from above the die cavity and replaced by the pick-up head as a result of further angular or linear motion of the work station positioner assembly. The punch is reciprocated upwardly so as to eject the compacted article from the die cavity into the pick-up head for transfer to a remote station, or, alternatively, for transfer to a collection station by subsequent motion of the work station positioner assembly.

By way of utilizing standardized punch and die assemblies in the form of interchangeable tool capsules, all adapted to be interchangeably mounted on the press table in an appropriate mounting aperture and held therein by any convenient means such as by mounting bolts, the remaining of the tool capsule projecting below the press table, with the punch actuating mechanism of the press appropriately connected to the punch actuating plate portion of the tool capsule, it is a simple matter after a production run of a particular part to remove a tool capsule and replace it by another tool capsule for compacting a different part. With the exception of the die, the punches, and the core rods, if any, all the other mechanical parts forming the tool capsule are subject to little or no wear. The die, the punch and the core rods, if any, are however, subject to important load stresses and to wear, as a result of which they may experience dimensional changes, such as a progressive opening of tolerances, and, if subjected to abnormal loads, they may be damaged beyond repair or even break. It is therefore convenient for the user to provide a tool capsule which can be easily dismantled and which provides easy removal of the die plates or of the die bushings, the punches and the core rods, when they become worn or when they break, for replacement by new plate or die bushings, punches and core rods. It is also desirable that replacement punches and core rods be reinserted in the tool capsule without too much fuss, without requiring complicated fixtures and gauges. In tool capsules comprising slender core rods for forming apertures in the compacted article it is also desirable that the core rods be easily replaced, and be adjustable in longitudinal position either individually, or as a group, or both, and, where a plurality of cores are used, that each individual core rod be replaceable without disturbing the position of the others.

SUMMARY OF THE INVENTION

The present invention provides a die, punch and core rod assembly, or tool capsule, for powder material compacting presses, provided with a stationary non-adjustable or adjustable core rod mounting plate supporting one or more stationary core rods, permitting removal and replacement of core rods without requiring the tool capsule to be removed from the press and/or dismantled, and allowing the longitudinal position of the individual core rods to be adjustably pre-set or, in the alternative and in addition, permitting the core rod support to be adjustably pre-set in a longitudinal position.

A better understanding of the present invention will be obtained by those skilled in the art when the following description of the best modes contemplated for practicing the invention is read in conjunction with the accompanying drawings wherein like numerals refer to like or similar parts and in which:

BRIEF DESCRIPTION OF THE DRAWINGS

FIG. 4 is a partial section along line 4—4 of FIG. 1;

FIG. 5 is a view similar to FIG. 4, but showing the punch element in a retracted position relative to the die element;

FIG. 6 is a perspective view of the principal portions of the die, punch and core rod assembly of FIGS. 1–5;

FIG. 7 is a perspective exploded view thereof;

FIG. 8 is a view similar to FIG. 4 but showing a modification thereof;

FIGS. 9 and 10 are alternative schematic views of core rod mounting according to the present invention; and FIG. 11 is a view similar to FIG. 8 but showing a further modification thereof.

DETAILED DESCRIPTION OF THE PREFERRED EMBODIMENTS

Figure 1:
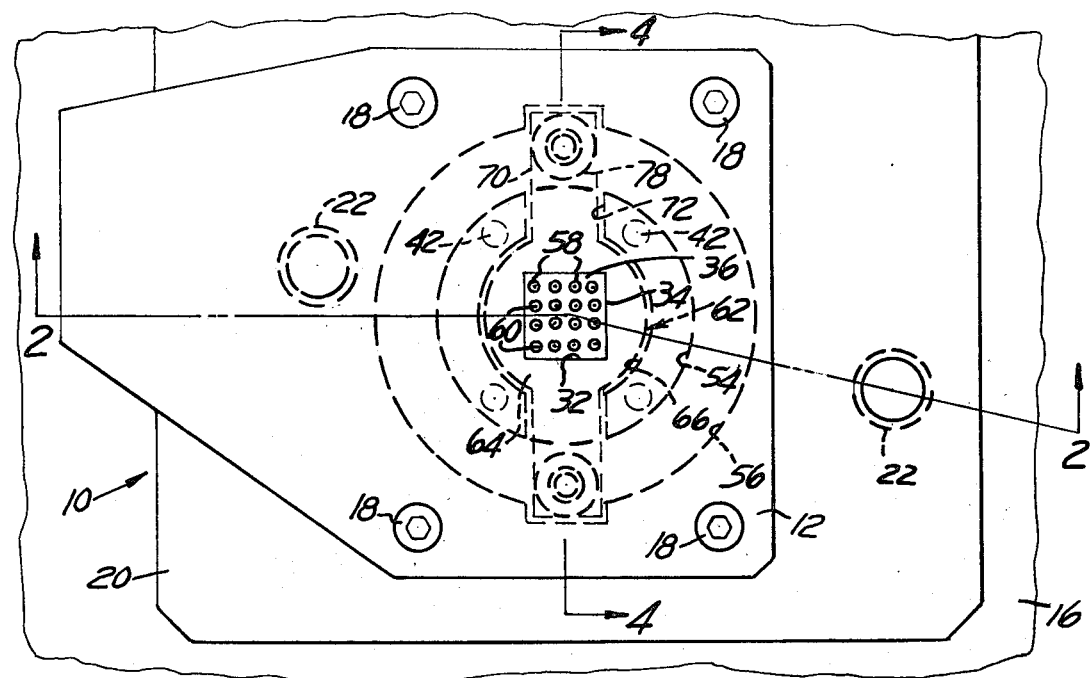
FIG. 1 is a top plan view of a die, punch and core rod assembly, or tool capsule, according to the present invention.
Figures 2, 3:
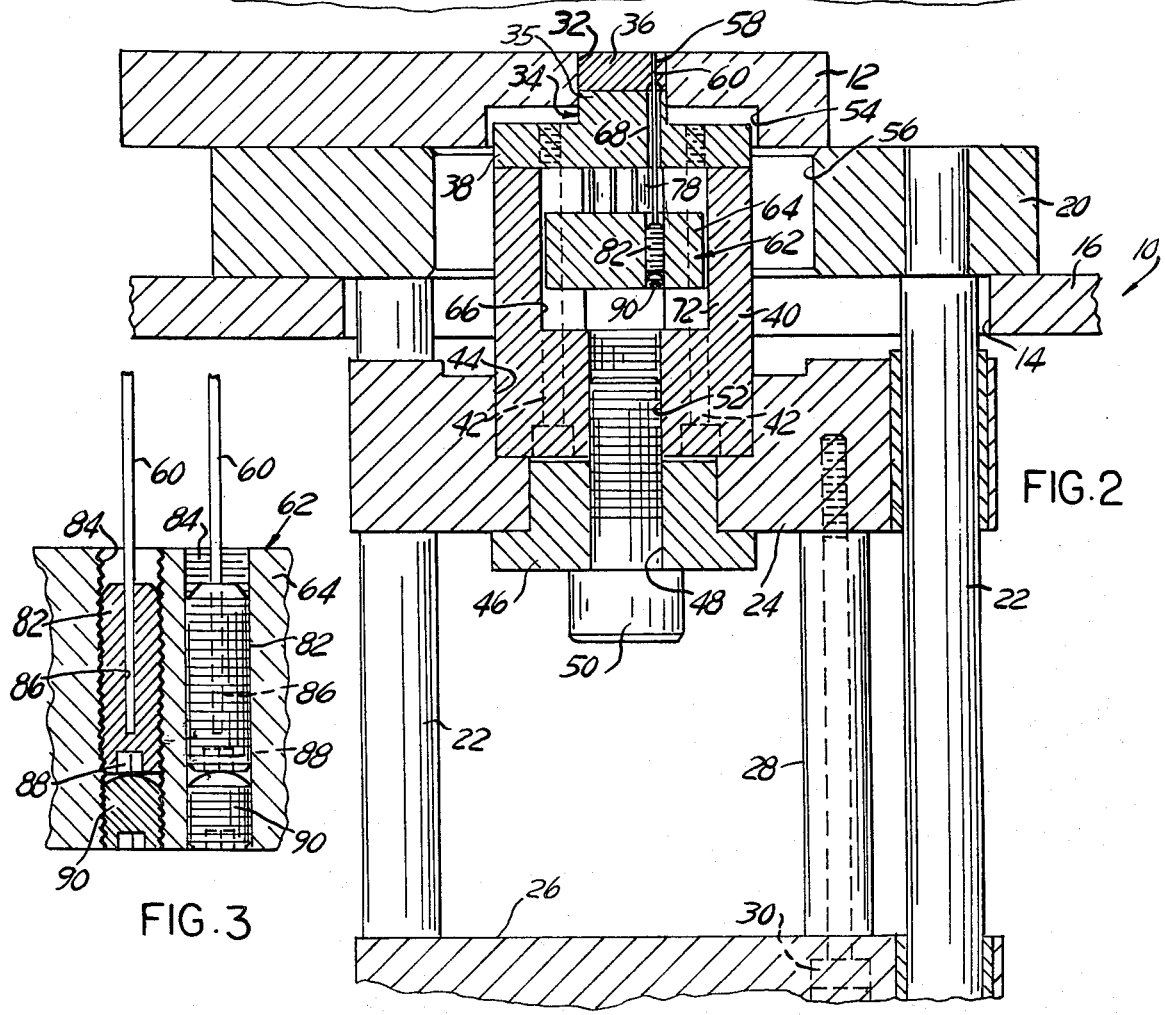
FIG. 2 is a section along line 2—2 of FIG. 1.
FIG. 3 is a view of a portion of FIG. 2 at an enlarged scale.

Referring to the drawings, and more particularly to FIGS. 1, 2 and 4 thereof, a die, punch and core rod assembly 10, or tool capsule, according to the present invention comprises a die plate 12 adapted for mounting in an opening 14 in the table 16 of a powder compacting apparatus, or press (not shown). The die plate 12 is mounted by means of countersunk screws 18, FIG. 1, on a spacer plate 20 in turn directly bolted or clamped, in a manner not shown, on the top of the table 16 over the opening 14. A pair of parallel spaced apart guide posts 22, mounted below the spacer plate 20, slidably support and guide a punch support plate 24 and a punch actuating platen 26 disposed parallel to each other and in spaced-apart relationship. The punch actuating platen 26 is mechanically connected to the press lower ram, not shown, for reciprocation therewith, and is rigidly connected to the punch support plate 24 by means of spacers such as tubular spacers 28, only one of which is shown, and bolts 30.

The die plate 12, made of heat-treated tool steel or of a metallic carbide, for example, has a die opening or cavity 32 in which is reciprocably disposed a punch 34 which may be made of solid construction but which, preferably, has a top block or insert 36 made of extra hard material such as a metal carbide or the like, and a body portion 35. If so desired, the die plate 12 instead of being directly provided with a die opening 32 may be provided with a fitted die bushing of extra hard material such as a carbide, in turn provided with the die opening or cavity 32.

The punch 34, which, in the example of structure illustrated, has a substantially square or rectangular body portion 35 and insert 36, is formed integral with a circular plate 38 bolted on the top of a generally cylindrical tubular punch base 40 by way of socket head bolts 42. The bottom of the punch base 40 is disposed in a stepped bore 44 in the punch support plate 24 and is solidly attached to the punch support plate 24 by means of a shouldered spacer bushing 46 having a central bore 48 through which is passed the body of a bolt 50 threading through a centrally disposed threaded bore 52 through the bottom of the cylindrical punch base 40. The die plate 12 has a cylindrical recess 54 formed on its lower surface to provide clearance around the punch circular plate 38, and the spacer plate 20 has an opening 56 providing passage therethrough of the punch base 40.

The punch 34 has a plurality of longitudinally disposed small bores 58 through each of which is passed a core rod 60. In the example of structure illustrated, the reciprocable punch 34 is designed to compact in the die opening or cavity 32, against the face of an anvil 59, FIG. 5, a substantially square or rectangular part, of powder material, the part being provided with apertures, each one corresponding to one of the core rods 60, as is well known in the art. The punch 34 is reciprocated downwardly to a position, for example, as shown at FIG. 5, the tip of the core rods 60 being evenly flush with the top surface of the die plate 12. The die opening or cavity 32 above the retracted punch is filled with powder material from a powder dispenser, not shown, and the anvil 59 is displaced to straddle over the die opening or cavity 32 and clamped in position. The punch 34 is reciprocated towards the anvil 59 such as to compact the powder material in the die opening or cavity 32 against the face of the anvil. Subsequently, the anvil 59 is displaced away from over the die opening or cavity 32, and the compacted part from the die opening or cavity 32, and the compacted part is ejected. Throughout the drawings the punch 34 is illustrated in a position corresponding to ejection of the compacted part from the die opening 32, except at FIG. 5 where the punch is illustrated in the approximate position it occupies during filling of the die opening or cavity 32 with powder material, prior to compacting the part, not shown. The core rods 60 are at all times held stationary during reciprocation of the punch 34.

The core rods 60 are supported by a plate or block 62. The plate or block 62 has a main body portion 64 freely disposed within a recess 66 in the punch base 40, below the punch support plate 38. The core rods 60 are each disposed through one of the bores 68, FIGS. 2, 4 and 5 in the integral punch plate 38 and punch body 35. The core rod support plate or block 62 has a pair of diametrally opposed arms 70, FIGS. 4–7, laterally projecting through longitudinal slots 72 formed in the wall of the tubular punch base 40, and the core rod support plate or block 62 is mounted, bridge-like fashion, below the die plate 12 by means of a pair of bolts 74 passed through vertically disposed bores 76 proximate the end of the arms 70 and through the interior of tubular spacers 78, the end of the bolts 74 threading through appropriate threaded bore 80 in the die plate 12. In this manner, when the punch plate 24 supporting the punch base 40 on the top of which the punch 34 is mounted is reciprocated, the core rod support plate or block 62 remains stationary.

As shown at FIG. 2 and in detail at FIG. 3, each core rod 60 is mounted longitudinally adjustable relative to the core rod support plate or block 62 by being supported in a threaded foot member 82 in turn threaded in a threaded bore 84 in the core rod support plate or block 62. The threaded foot member 82 is preferably in the form of an elongate set screw having an axially disposed blind bore 86 in which is press-fitted, cemented, or otherwise fastened the end of the core rod 60. By introducing the end of a driving tool, such as a hexagonal tip wrench, in the hexagonal socket 88 at the end of the set screw-like member 82, each core rod 60 may be adjustably positioned relative to its support plate or block 62 such that the tips of all the core rods 60 are disposed at an even level which correspond, for anvil pressing, to the top edge of the die opening 32 (FIGS. 4–5). Once a correct longitudinal position of the core rods 60 has been achieved, a set screw 90 is tightened in the threaded bore 84 against the bottom end of the set screw foot member 82.

At FIG. 8 there is illustrated a structure for a die, punch and core rod assembly 10' substantially similar to the structure of FIGS. 1–7, but wherein the core rods 60 are fixedly supported by the core rod support plate or block 62. The main body portion 64 of the core rod support plate or block 62 has a bore 92 through which is passed the body portion of each core rod 60 provided at its end with an enlarged foot portion 94. A retainer plate 96, fastened to the bottom of the core rod support plate or block 62 by screws or bolts 98, has a recess or pocket 100 in which are disposed the foot portions 94 of the core rods 60 for clamping the core rods in position. In the structure of FIG. 8, although the core rods 60 are not individually adjustable in longitudinal position, the core rod support plate or block 62 is adjustably mounted below the die plate 12, such as to provide longitudinal positioning of the core rods 60 as a group. For that purpose, each arm 70 of the core rod support plate or block 62, projecting from the punch base 40 through the slots 72, has a threaded bore 102 in which is disposed the peripherally threaded portion 104 of a spacer sleeve 106. The spacer sleeve 106 has a plurality of radial bores 108 permitting to rotate the spacer sleeve 106 by means of a tool in the form of a rod introduced through a radial bore 108, such that each of the spacer sleeves 106 may be extended from the top of the arm 70 of the core rod support plate or block 62 to space the core rod support plate or block 62 from the die plate 12, with the end face 110 of each spacer sleeve 106 engaging the bottom surface of the die plate 12. A pair of mounting bolts or hexagonal socket head screws 112 each passed through the internal bore 120 of a spacer sleeve 106 and threading through an appropriate threaded bore 122 on the bottom of the die plate 12 securely affixes the core rod support plate or block 62 an appropriate distance below the die plate, such that the tips of all the core rods 60 are fixedly disposed where required in the die opening or cavity 32, for example even with the edge of the die cavity. As the longitudinal position of each core rod 60 is not individually adjustable, such a structure requires, once all the core rods 60 are installed in the core rod support plate or block 62, that their tips be ground even.

As illustrated at FIG. 9, other means may be provided for mounting the core rods 60 in the core rod support plate or block 62, for example, by providing the core rod support plate or block 62 with apertures 92 through each of which is passed the body portion of a core rod 60 proximate its enlarged diameter foot portion 94, the foot portion 94 being disposed in an enlarged diameter bore portion or recess 124 at the bottom of the core rod support plate or block 62. The retainer plate 96 is provided with a plurality of threaded bores 126, each aligned with the axis of a core rod 60, and in which is threaded a set screw 128 having its tip pressing against the bottom surface of the core rod foot portion 94. Alternatively, and as shown at FIG. 10, the threaded bore 126 may be disposed directly in the core rod support plate or block 62.

Although the structures of FIGS. 8–10 do not allow individual longitudinal adjustment of each core rod 60, they permit lateral position adjustment, thus requiring less precise machining and alignment of the apertures or recesses receiving the bottom of the core rods in the core rod support plate or block 62 relative to the bores 58 through the punch insert 36. The bores 58 act as a centering means for the core rods 60, which are free to be laterally displaced slightly within the bore 92 and enlarged bore 124, for self-alignment, during assembly, after which the individual set screws 128 are tightened, FIGS. 9 and 10, or the retaining plate 96 is tightened, FIG. 8.

As illustrated at FIG. 11, the present invention contemplates, a die, punch and core rod assembly, or tool capsule structure 10", including core rods 60 individually adjustable in longitudinal position according to the structure shown, for example, at FIG. 3 in detail, supported by a core rod support plate or block 62 adjustable in position relative to the die plate 12 by means of the threaded spacer sleeves 106 of FIG. 8.

It will be appreciated by those skilled in the art that, although the invention has been described with reference to structures including a single punch co-operating with a single cavity die, the principles of the present invention are applicable to multiple punch and multiple die cavity arrangements.

Having thus described the present invention by way of structural examples thereof, modification whereof will be apparent to those skilled in the art,

What is claimed as new is as follows:

1. A punch and die assembly for a powder compacting press, said assembly comprising a stationary die plate, at least one reciprocable punch and at least one stationary core rod having an end slidably disposed in a bore through said punch, means reciprocably supporting said punch relative to said die plate, and means supporting said core rod at the other end in a stationary adjustable position relative to said die plate, said last mentioned means comprising a core rod support plate disposed below said punch, means attaching said other end of said core rod to said core rod support plate and means attaching said core rod support plate to said die plate, wherein said means attaching said core rod support plate to said die plate comprises a variable length spacer, said variable length spacer comprising a rotatable sleeve member having a peripherally threaded portion, a threaded bore in said core rod support plate accepting the peripherally threaded portion of said sleeve member, and a bolt passed through said sleeve member and threading at its end in a threaded aperture in said die plate for locking said sleeve member in position.

2. The punch and die assembly of claim 1 wherein said core rod is attached to said core rod support plate by means providing longitudinal adjustment of said core rod relative to said core rod support plate.

3. The punch and die assembly of claim 2 wherein said means providing longitudinal adjustment of said core rod comprises a threaded member fastened at said other end of said core rod, a threaded bore in said support plate accepting said threaded member and a second threaded member threading in said threaded bore below said first threaded member and engageable with the end of said first threaded member for locking said first threaded member in position in said threaded bore.

4. The punch and die assembly of claim 3 wherein said first threaded member is an elongate set screw having a longitudinal bore in which is fitted the other end of said core rod.

5. The punch and die assembly of claim 4 wherein said second threaded member is a second set screw.

6. The punch and die assembly of claim 1 wherein said means reciprocably supporting said punch relative to said die plate comprises a punch base member supporting said punch and connected to a reciprocable platen, and wherein said core rod support plate is disposed in a recess within said punch base member, said core rod support plate having integral support arms each projecting through a slot in said punch base member and forming said means attaching said core rod support plate to said die plate.

7. The punch and die assembly of claim 6 wherein said means reciprocably supporting said punch relative to said die plate comprises a punch base member supporting said punch and connected to a reciprocable platen, and wherein said core rod support plate is disposed in a recess within said punch base member, said core rod support plate having integral support arms each projecting through a slot in said punch base member and forming said means attaching said core rod support plate to said die plate.

* * * * *